United States Patent [19]
Crippa

[11] Patent Number: 6,044,735
[45] Date of Patent: Apr. 4, 2000

[54] TUBE MACHINING APPARATUS

[75] Inventor: Aurelio Crippa, Arosio, Italy

[73] Assignee: Fabbrica Macchine Curvatubi Crippa Agostino, S.P.A., Italy

[21] Appl. No.: 09/034,707

[22] Filed: Mar. 4, 1998

[30] Foreign Application Priority Data

May 30, 1997 [EP] European Pat. Off. .............. 97830263

[51] Int. Cl.⁷ .................................................. B23B 13/10
[52] U.S. Cl. ................................ 82/124; 82/126; 82/127; 82/129; 414/14
[58] Field of Search ............................ 82/124, 126, 127, 82/129, 120, 121, 162, 159; 414/14, 18

[56] References Cited

U.S. PATENT DOCUMENTS

| | | | |
|---|---|---|---|
| 4,302,144 | 11/1981 | Hallqvist ..................................... | 82/2.5 |
| 4,404,878 | 9/1983 | Blanchard et al. ......................... | 82/2.5 |
| 4,821,612 | 4/1989 | Myers ....................................... | 82/124 |
| 5,115,702 | 5/1992 | Link ......................................... | 82/126 |

OTHER PUBLICATIONS

Patent Abstracts of Japan, vol. 013, No. 373 (M–861), Aug. 18, 1989 & JP 01 127203 A (Suga Tekkosho: KK), May 19, 1989.
Patent Abstracts of Japan vol. 011, No. 323 (M–634), Oct. 21, 1987 & JP 62 107824 A (Chuo Denki Seisakusho:KK), May 19, 1987.

*Primary Examiner*—Henry W. H. Tsai
*Attorney, Agent, or Firm*—Robert F. I. Conte Lee, Mann, Smith

[57] ABSTRACT

A tube machining apparatus is described which comprises a support frame (2), an intermediate body (6) arranged to carry tools (7), a clamp (8) for locking at least one tube (4) at a predetermined processing or machining station (9), and at least one gripper (16) for acting by grasping on each tube. Gripper (16) and tools (7) are carried by the intermediate body (6) and movement means (17) is provided which is interposed between the intermediate body (6) and the support frame (2) and is capable of simultaneously moving both the gripper and the different tools between respective rest and work positions.

19 Claims, 4 Drawing Sheets

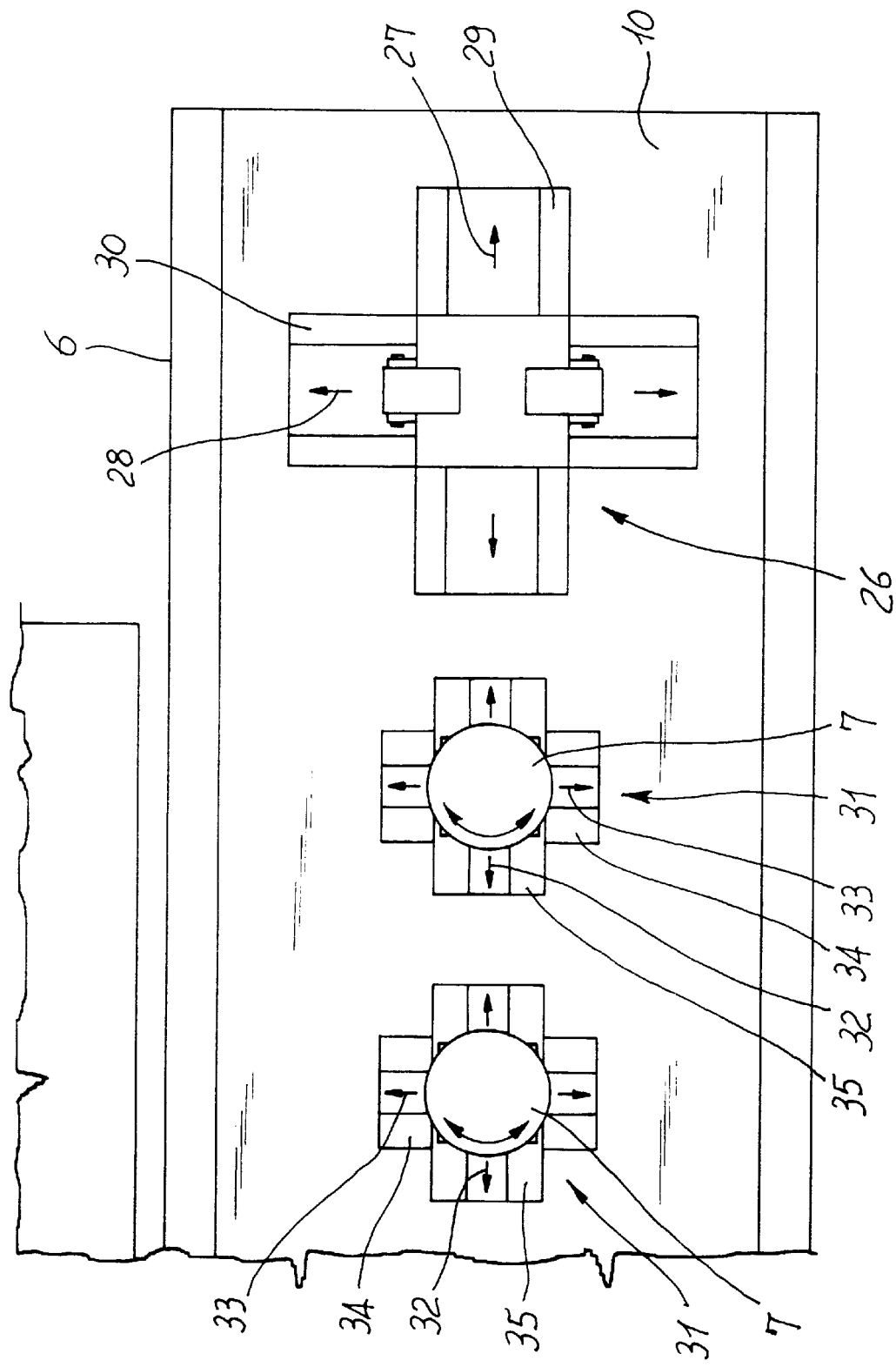

TUBE MACHINING APPARATUS

FIELD AND BACKGROUND OF THE INVENTION

The present invention relates to a tube machining apparatus. In more detail, the invention relates to an apparatus arranged to machine end portions of metal tubes adapted for use in the most varied manners and comprising: a support frame; a tool-carrying intermediate body operatively associated with the support frame; means for locking at least one tube at a predetermined processing station; a predetermined number of tools carried by the intermediate body and each arranged to carry out a respective machining on said tube; grip means operatively associated with the support frame and arranged to act by grasping on each tube.

It is known that, depending on the applications for which they are intended, tubes made of metal material frequently require machining at their end portions for the purpose of defining appropriately-shaped configurations such as flanges, connection and attachment areas, portions having greater or smaller radial extension than that of the remaining tube portion, etc.

For the above reason, machine tools capable of carrying out appropriate machining at the tube end portions have come into wide use.

These machines generally comprise a feeding station, where a plurality of tubes is generally disposed, a processing station, and a discharge station where tubes are sent after processing by the apparatus.

The processing station typically is comprised of a clamp intended for engaging the end portion of the tube to be submitted to machining, as well as one or more tools mounted on the operating head and capable of being selected and moved close to the clamp so as to carry out the desired machining on the tube end portion. It is to note that presently the loading movement from the feeding station to the clamp engaging the tube to be processed is carried out by a robotized arm which, being interlocked to appropriate and sophisticated control means, picks the tube up and moves it along a predetermined path of travel until it is locked by the clamp at the processing station.

Likewise, the same robotized arm or another arm, once machining on the tube has been completed, will pick up the processed tube from the clamp and move it to the discharge station where it is laid down.

In other words, means intended for handling the tube from the feeding station to the processing area and from the latter to the discharge station are completely independent of the means for moving and selecting the tools carrying out machining on the tube end portion. Practically, the robotized arm or arms are to be provided with respective control means for each of the axes according to which each of these arms is to be actuated. It is the same for the means for moving and selecting the tools.

Therefore, a primary drawback in apparatuses of known type is the great complexity from a mechanical point of view and as regards the control circuitry that is required for ensuring a correct operation of the whole apparatus.

Clearly, mechanical and circuit heaviness greatly impair the operating flexibility and ability of the machine, which, on the other hand, will have negative repercussions in the economical field.

In addition, apparatuses of the traditional type are substantially unable to offer a wide variety of tools for tube machining and manage movement of each tool in a rational and efficient manner.

SUMMARY OF THE INVENTION

Under this situation, the main object of the present invention is substantially to eliminate all the above drawbacks and operating limits by providing a new apparatus that while having a high operating efficiency and very high production rates is of simple structure and can be easily automated.

The foregoing and further objects that will become more apparent in the progress of the present description are substantially achieved by a tube machining apparatus wherein the grip means too is carried by the intermediate body and wherein movement means is provided which is operatively interposed between the intermediate body (6) and the support frame and is capable of moving the intermediate body to enable displacement of each tool between a rest position in which it is spaced apart from the tube being machined, and an operating position in which it acts on said tube, and which is also capable of moving said grip means to enable displacement of same from a feeding station in which unprocessed tubes are picked up, to the processing station and from the latter to a discharge station, in which the machined tubes are laid down.

BRIEF DESCRIPTION OF THE DRAWINGS

Further features and advantages will be best understood from the detailed description of a preferred but non-exclusive embodiment of an apparatus in accordance with the present invention which is taken hereinafter with reference to the accompanying drawings, given by way of non-limiting example, in which:

FIG. 3 diagrammatically shows a fragmentary front view of an intermediate tool-carrying body being part of the machine which is the object of the invention;

DESCRIPTION OF THE PREFERRED EMBODIMENT

Figure 1:
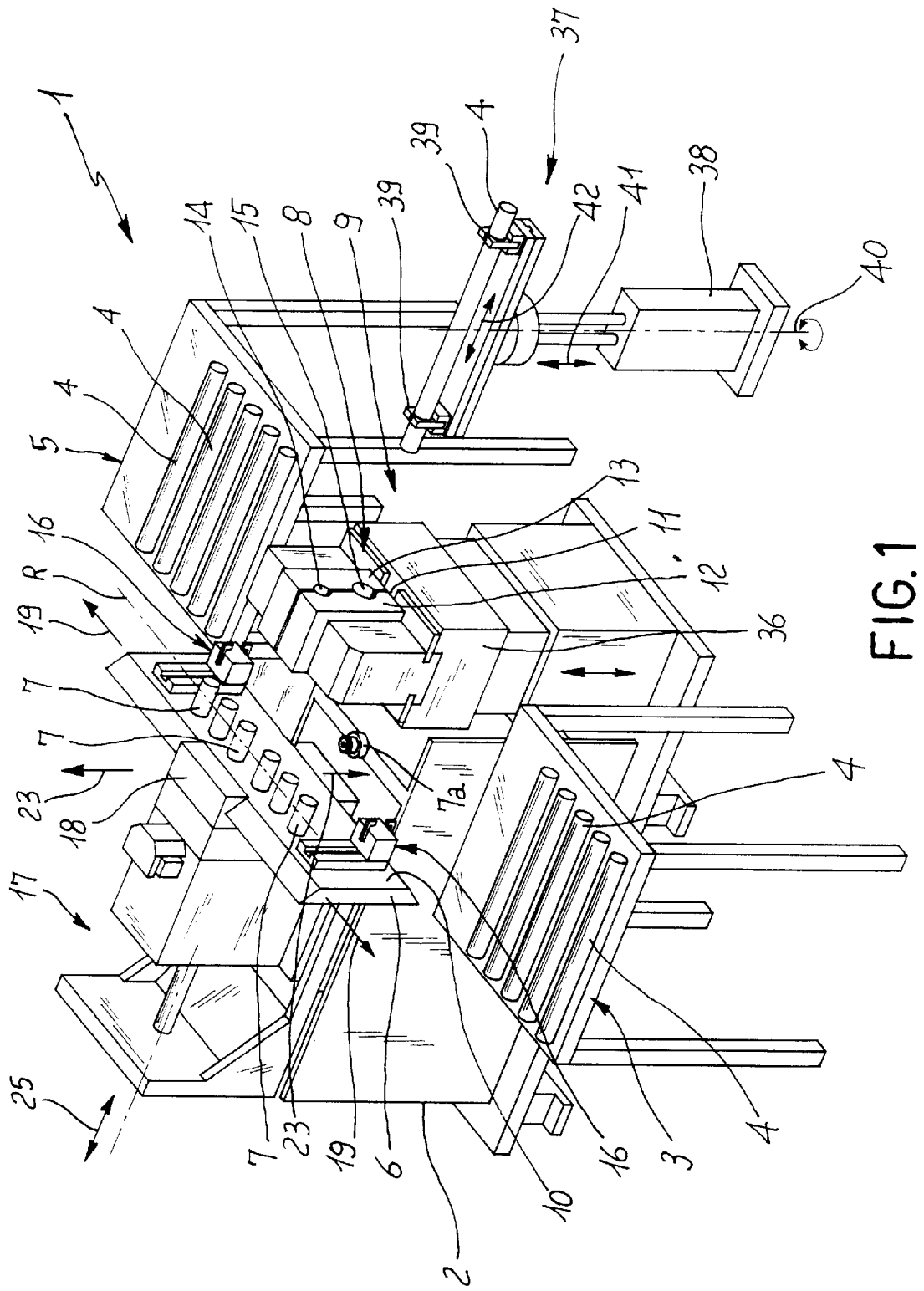
FIG. 1 is a perspective view of a first preferential embodiment of an apparatus in accordance with the present invention.

With reference to the drawings, a tube machining apparatus in accordance with the present invention has been generally identified by reference numeral 1.

More precisely, it is to point out that the apparatus in question is preferably intended for machining end portions of tubes to make attachment flanges, radial enlarging or narrowing portions, machining for material removal and machining for creating deformations of any nature depending on the particular conformation to be given to the tube.

Apparatus 1 in reference conventionally comprises a support frame denoted by 2 with which first and second elements for tube collection are associated, at laterally opposite positions for example; said elements respectively define a feeding station 3, from which unprocessed tubes 4 are picked up, and a discharge station 5 where tubes 4 are laid down after they have been machined by the apparatus.

Clearly, the feeding and discharge stations can be defined by mere stands on which the tubes are laid or other support structures of types known by themselves.

Figure 2:
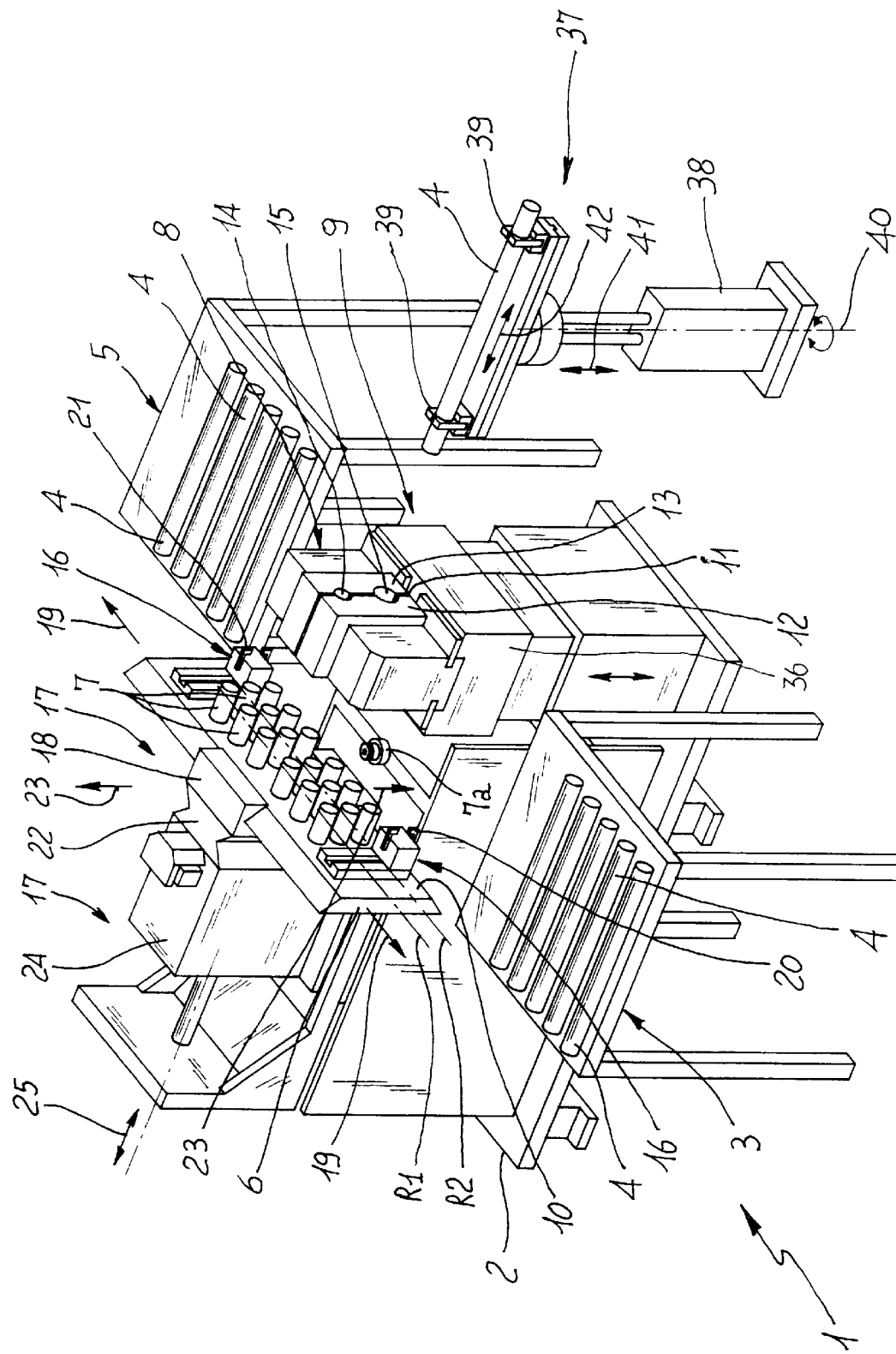
FIG. 2 is a perspective view of a second preferential embodiment of an apparatus in accordance with the invention.

Mounted on the support frame 2 is an intermediate tool-carrying body 6 arranged to clamp a predetermined number of tools 7 each of which will be in a position to carry out a respective machining on the end portion of the tube submitted to processing. It is to note that, in order to conveniently hold each tube 4 during machining, apparatus 1 also comprises locking means 8 which is also operatively associated with the support frame 2 and arranged to fix at least one tube 4 at a predetermined processing station 9 at which tools can operate. In more detail, as shown in FIGS. 1, 2 and 3, it is to note that the intermediate tool-carrying body 6 is defined by a plate-like element having an operating front surface 10 which is preferably flat and of vertical extension and which faces the locking means 8 of the tube submitted to machining. In this manner, practically, the different tools associated with the operating front surface of the intermediate body are at an opposite position relative to the tube held by the locking means 8 at the processing station 9 and they have their axes parallel to the tube axis.

It is to note that in accordance with an important aspect of the present invention the locking means 8 is defined by a clamp 11 formed of a first and a second halves 13 which are movable in respect of each other between an approaching position at which the tube is clamped by the locking means and a moving-away position at which the tube can be disengaged from the locking means.

Advantageously, each of said halves is such shaped that clamp 11, when the two halves 12 and 13 are close to each other, defines a predetermined number of engagement grooves having differentiated sizes and/or shapes. Preferably, a first and a second engagement groove 14, 15 is provided for the tube to be machined and they have differentiated diameters from each other. This enables machining to be carried out either on tubes of different diameters or on the same tube when diameter increases or decreases are involved in the machined portions relative to the nominal diameter of the same tube in the initial condition, as better clarified in the following when operation of the apparatus in question will be explained.

It is to note that, if desired, clamp 11 can be equipped with a number of grooves greater than two having shapes that may be different from the circular one, in order to obtain the simultaneous holding of several tubes and the possibility of machining tubes of particular conformation in cross section.

Still with reference to the locking means 8, it is to note that the clamp may have grooves disposed either in a horizontal (FIG. 5) or in a vertical (FIG. 4) side by side relationship. Obviously, depending on the particular cases, a relative movement of the halves may be provided of such an extent that opening and closing of the clamp is allowed (see FIGS. 4 and 5 again).

The apparatus in question further comprises grip means 16 also operatively associated with frame 2 and arranged to act on each tube by grasping. In an original manner, the grip means too are carried by the intermediate body 6 and, therefore, they are submitted to the same movements imparted thereto. Also provided in this connection is movement means 17 interposed between the intermediate body 6 and support frame 2, capable of moving the intermediate body in such a manner that displacement of each tool 7 is allowed between a rest position, in which this tool is moved away from the tube being machined, and an operating position in which the tool acts on the tube held by the locking means 8. Simultaneously, the movement means acting on the intermediate body is such shaped and positioned that it enables a displacement of the grip means 16 from the feeding station 3, where the grip means is able to act on and pick up the tube to be machined, towards the processing station 9, where the grip means is able to position the tube to be machined close to the locking means, and from the processing station 9 to the discharge station 5, where the grip means 16 can lay down the tube after the latter has been submitted to machining. Advantageously, therefore, by virtue of the arrangement of the grip means on the intermediate body, by the only movement means associated with the intermediate body itself, both correct positioning of the tools and movement of the grip means can be carried out.

Tools 7 are positioned on the intermediate body 6 in mutual-alignment relationship according to at least one predetermined straight line "R". In this case the movement means 17 will have a first coupling member 18, interposed between the intermediate body 6 and the support frame 2, to enable a reciprocating motion of the intermediate body in a first direction 19 parallel to said tool-alignment straight line "R".

By way of example, if the tools are aligned following a rectilinear horizontal arrangement (see FIG. 1), the first coupling member, consisting of a slide, a guide or other element possibly moved by actuators or worm screws or other members, will give rise to a reciprocating movement of the intermediate body in a first direction 19 which is horizontal as well. In this case, the grip means 16 will be able to be mounted in a rigid manner on the intermediate body. Practically, in an embodiment of this type, by exclusively moving the intermediate body in a first direction, by virtue of the first coupling member, it will be possible to carry out selection of the tools and bring the grip means from the feeding station to the processing station and the discharge station. Therefore, by exclusively controlling movement along a single axis, that is the above stated first direction 19, one will be able to carry out both handling of the tubes (grip means) and selection of the tools, which will clearly simplify both the required control circuitry and the mechanical structure of the machine.

It is to note that typically, the intermediate body carries a predetermined number N of tools 7 and therefore the movement means will have to ensure a displacement according to at least one number N of differentiated translations along said first direction 19.

In addition, it is to note that the grip means 16 comprises a first pick-up member 20 capable, in cooperation with the movement means 17, to act by grasping on the tubes at the feeding station and bring them to the processing station, as well as a second pick-up member 21 capable, in cooperation with the movement means 17, to act by grasping on said tubes at the processing station 9 and move them to the discharge station 5. The first and second pick-up members 20, 21 are advantageously associated with the intermediate body at opposite ends with reference to the tool line. Practically, with reference to the embodiment referred to in FIG. 1, the first and second pick-up members are connected to the intermediate body at the horizontally opposite ends of the latter.

In this manner, if the feeding and discharge stations are conveniently disposed laterally of the fixed frame (see FIGS. 1 and 2), each of the pick-up members 20, 21 can easily act by grasping on the tubes, their action involving a minimum movement stroke by the movement means.

Alternatively to the above description, with reference to the embodiment shown in FIG. 2, tools may be provided to be disposed mutually in side by side relationship, in engagement with the intermediate body 6 and aligned according to a predetermined number of straight lines $R^1$, $R^2$, $R^N$ parallel to each other, forming a matrix-like configuration for example, with a predetermined number of rows and a predetermined number of columns. Shown in the embodiment in FIG. 2 are eighteen tools disposed as a rectangular matrix consisting of three rows and six columns.

In this case, in order to enable selection of each tool 7 and correct positioning of same at the processing station 9 and therefore close to the locking means 8, a first coupling member similar to the one described above may be provided, which is interposed between the intermediate body 6 and the support frame 2 to enable a reciprocating displacement of the intermediate body in a first direction 19 parallel to said aligning straight lines and at least one second coupling member 22, also interposed between the intermediate body and the support frame to enable a reciprocating displacement of the intermediate body in a second transverse direction, preferably perpendicular to the first direction. Practically, since the tools have a matrix-like arrangement, it will be necessary to be able to move said tools both horizontally (first direction) and vertically (second direction), in order to be able to move each tool to the desired operating position. In this case too, the intermediate body advantageously engages the grip means 16 the arrangement and conformation of which is substantially similar to that already described with reference to the embodiment in FIG. 1 and therefore will not be herein repeated. It is however to note that, by virtue of the second coupling member, the grip means too will be able to undergo movements parallel and transverse to the aligning straight lines $R^1$, $R^2$, $R^N$ of the tools, i.e., in the case shown in FIG. 2, it will be able to undergo both horizontal and vertical movements in a plane defined by the operating front surface of the intermediate body.

As already said with reference to the first coupling member 18, the second coupling member 22 as well will be defined by slides, guides, optionally driven by hydraulic or pneumatic actuators or by means of worm screws or other kinematic mechanisms and actuators of a type known per se and therefore not further described or illustrated.

Still in accordance with the invention, the apparatus further comprises a third coupling member 24, interposed between the intermediate body 6 and the support frame 2, which member enables a reciprocating motion of the intermediate body in a third direction 25, transverse both to the first and second directions and, more particularly, parallel to the axis of the tube to be processed located at the processing station 9.

By virtue of the third coupling member 24, substantially each tool may be moved axially close to and away from each locking means 8. Once more, obviously, since the third coupling member acts by causing movement of the intermediate body, this third member enables both tools 7 and grip means 16 to be moved in a third direction. It is to note that in the simplest embodiment, which however due to the particular structure of the apparatus in question is capable of ensuring all necessary displacements, at least movements in the first and third directions are typically provided. By control of these two axes only, the following operations may be carried out: tool selection, related axial movement for engagement and machining of the end portion of the tube tightened by the locking means, movement of the grip means to carry out handling of the tube between the different feed, processing and discharge stations.

It is to note that in accordance with preferential solutions of the present invention, also first auxiliary movement means 26 may be provided which is operatively interposed between the grip means 16 and intermediate body 6. The auxiliary movement means, depending on the particular operating requirement, will be such shaped as to enable a displacement of the grip means 16 in a plane defined by the front surface of the intermediate body in a fourth 27 and optionally fifth 28 directions transverse of each other. By way of example, the fourth and fifth directions may take place horizontally and vertically respectively and, in any case, they are both transverse to the axis of a tube to be machined located in the processing station (this embodiment is shown by way of example in a diagrammatic view in FIG. 3).

It is to note that the first auxiliary movement means may be comprised of a first slide 29 or similar engagement member to cause movement in the fourth direction and a second slide 30 or other similar engagement member to cause movement of the grip means in the fifth direction.

Typically, movements in the fourth and fifth direction 27, 28, as on the other hand shown in the accompanying drawings, have a reduced extension and are substantially arranged to carry out a displacement for fine adjustment of the grip means.

In the same manner as above described, a predetermined number of tools 7 associated with the intermediate body 6 may be each equipped with second auxiliary movement means 31, operatively interposed between the intermediate body and the tool for enabling a tool displacement in a sixth 32 and optionally a seventh direction 33 transverse to each other and substantially lying in the plane defined by the front surface 10 of the intermediate body 6.

The sixth and seventh directions 32, 33, as shown in the figures and in particular in FIG. 3 will be transverse and in particular perpendicular to the axis of the tube to be machined placed in the processing station. It is to note that in this case too, from a construction point of view, the second auxiliary movement means 31 can be defined by slides 34, 35, guides or other members which, upon operation of actuators of any nature, enable vertical and horizontal movements of the tools relative to body 6.

Advantageously, the second auxiliary movement means 31 will be also able to perform a rotation of tools 7 about their own axis, which rotation is typically useful if the tool is intended for carrying out material-removal operations at the end portion of the tube to be machined.

In this case, a pneumatic system may be provided in which, once the tool intended for machining reaches the appropriate operating position at the processing station 9, a quick-fitting system 7a acts on the second auxiliary movement means 31 for driving the tool in rotation.

Figure 5:
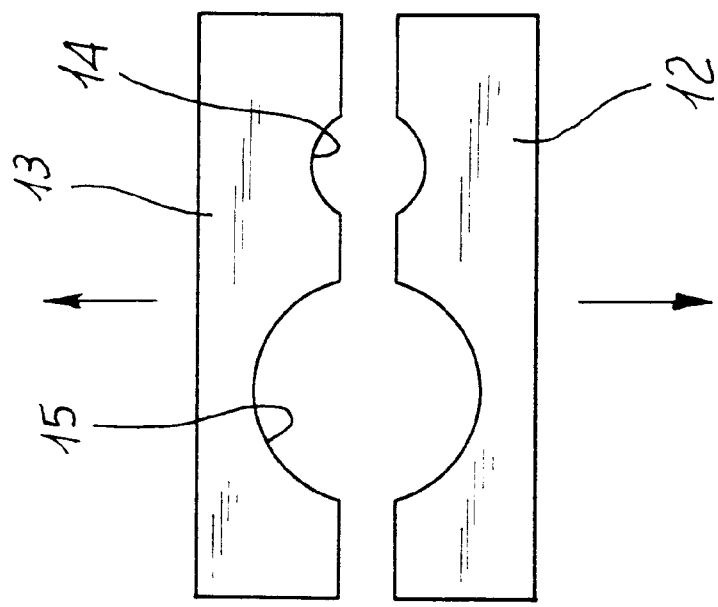
FIG. 5 is a diagrammatic view similar to FIG. 4 of a possible alternative embodiment of the locking means to be associated with the apparatus of the invention.
Figure 4:
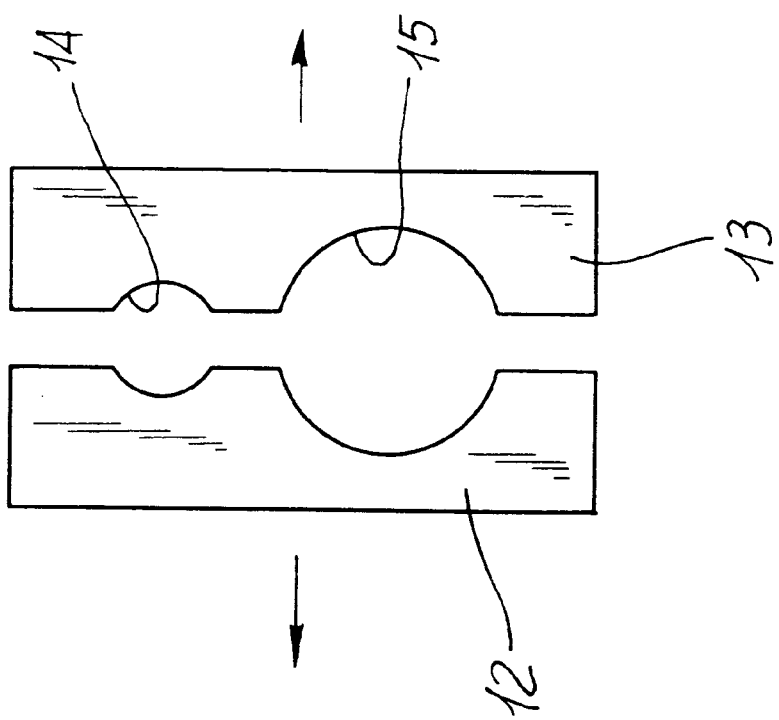
FIG. 4 is a diagrammatic view relating to locking means associated with the apparatus in accordance with the invention.

By virtue of the auxiliary movement means, tools 7 can move horizontally and vertically so that, once they have been brought substantially close to the processing station, they engage the desired groove 14, 15 of clamp 11, either if the latter is of the type shown in FIG. 4 or of the type shown in FIG. 5.

Advantageously, the locking means 8 and consequently clamp 11 can be carried by a translating support 36 enabling a vertical mobility of the locking means 8. This mobility can be also used to move either groove close to the tool 7 to be used.

Finally, it is to point out that the apparatus in accordance with the invention also comprises a service unit 37 operatively associated with the locking means 8 and intended for picking up a tube being processed from said locking means in order to carry out overturning of same so as to have the tube end portion opposite to the starting tube portion engaged by said locking means.

In more detail the service unit 37 comprises a support body 38, consisting for example of a post-like structure, and at least one grip element 39 intended for acting on one intermediate portion of the tube submitted to machining. The grip element 39 is rotatably engaged with the support body 38 according to a predetermined, preferably vertical, rotation axis 40, to enable an overturning movement of the tube in order that, as already said, the tube may be machined at either end thereof. It is to note that optionally the grip element 39 can be also engaged with the support body 38 for movement along a first and/or a second auxiliary directions 41, 42. The first auxiliary direction is transverse to the tube axis at an anchoring position in the locking means (in the solution shown in FIGS. 1 and 2 the first direction 41 is a vertical one), in order to enable a displacement of the grip element capable of adapting the grip element position to the tube position in the locking means, should said locking means have several grooves 14, 15. As another possible solution, the grip element 39 may be also movable in a second direction 42 parallel to the tube axis at an anchoring position in the locking means to enable the grip element or elements (if they are more than one; see FIGS. 1 and 2 again), to engage the appropriate portion of the tube to be overturned depending on the longitudinal extension and structure of the latter.

Operation of the apparatus of the invention described above mainly as regards structure, is as follows.

If for example machining is to be carried out on both ends of a plurality of tubes located in the feeding station, the apparatus carries out movement of the intermediate body in the first horizontal direction in order to bring the first pick-up member 20 substantially close to the feeding station.

Should the feeding station be conveniently positioned, the first pick-up member will be able to act by grasping on a tube 4 to be machined and, by moving the intermediate body in the opposite direction, will bring this tube to the processing station 9 or engage it in one of grooves 14, 15 of the locking means 8. It is to note that in order to enable grasping of the tube, also a movement of the intermediate body in the third direction 25 is likely to be required in order to move the grip means parallelly to the direction defined by the tube axes.

Once the tube has been conveniently positioned in the corresponding groove of the locking clamp, the movement means 17 causes selection of the tool designed to act on the tube ends in order to machine them. Usually, in accordance with the simplest solution of the present invention, movement of the intermediate body in accordance with the first and subsequently the third direction will be sufficient in order to cause a correct actuation and engagement of the selected tool. When machining has been completed, the intermediate body will have to be moved still in the first and third directions in order to bring the second pick-up member 21 close to the locking means 8 so as to act by grasping on the tube and bring it to the discharge station.

If the tube is to be submitted to machining at both ends, beside the above described steps, intervention of the service unit 37 may be required, which unit by acting on the tube being machined, once processing at the first end has been completed, will be able to carry out overturning of the tube and engagement of the second end thereof to the locking means 8 so that this end too may be machined.

With reference to the locking means, as already briefly mentioned above, it is to point out that said locking means can be defined by a first and a second halves movable relative to each other to enable the tube release and anchoring depending on whether the tube is to be moved away from the locking means or engaged in it to enable the desired machining by the tools. If clamp 11 has several grooves, it will be possible to move it either in a vertical or in a horizontal direction depending on the clamp conformation, so as to select the groove where the tube is to be positioned. It will be recognized that one can select movements to be imparted to tools, grip means, locking means or service unit, depending on the particular operating requirements and the particular complexity to be given to the apparatus.

Obviously, the clamp may be maintained fixed and only the tools may be moved or vice versa, depending on requirements.

The invention achieves important advantages.

Firstly, it is to note that due to positioning of the grip means and tools on the intermediate body, a thorough control of the machine can be in principle obtained by substantially moving the intermediate body along a single axis, i.e. the one defined by the first direction. This makes the machine greatly simpler, enables machining to be carried out in a very precise manner, ensures high production rates and makes the apparatus very reliable in operation.

The different alternative forms of the invention are advantageous as well.

In particular, the presence of a multi-grooved clamp, each of said grooves having any sizes and/or shapes, enables differentiated machining to be carried out at the ends of one and the same tube, or tubes of different diameters and sections to be machined.

In addition, the presence of the service unit in cooperation with the particular structure of the multi-grooved locking means enables loading of a second tube to be carried out into another groove of the locking means while one tube is being overturned. In other words, the apparatus in question enables production rates to be optimized and, as a result, achievement of a machining speed higher than that of traditional apparatuses.

In addition, if the tools and/or the grip means are given movements in several directions, these movements can be of reduced amount and carried out according to a predetermined number of previously established positions. In other words, the grip means and tools may be moved in more than one or several positions according to the different movement directions, which several positions however generally are of a restricted number because, due to the presence of the intermediate body and movement means, both tools and grip means may be, in most cases, moved by said intermediate body and movement means themselves.

What is claimed is:

1. A machine tool for tube processing, comprising:

a support frame (2);

a tool-carrying intermediate body (6) operatively associated with the support frame;

means (8) for locking at least one tube (4) at a predetermined processing station (9);

a predetermined number of tools (7) carried by the intermediate body (6) and each arranged to carry out a respective machining on said tube (4);

grip means (16) operatively associated with the support frame (2) and arranged to act by grasping on each tube, said grip means (16) being carried by the intermediate body (6); wherein movement means (17) is provided which is operatively interposed between the intermediate body (6) the support frame (2) and is capable of moving the intermediate body to enable displacement of each tool (7) between a rest position in which it is spaced apart from the tube being machined, and an operating position in which it acts on said tube, and which is also capable of moving said grip means (16) to enable displacement of same from a feeding station (3) in which unprocessed tubes are picked up, to the processing station (9) and from the latter to a discharge station (5), in which the machined tubes are laid down;

a service unit (37) operatively associated with locking means (8) to pick-up a tube being processed from said means, carry out overturning of same, and position the tube again at the locking means to enable machining of the opposite end of the same tube.

2. The machine tool as claimed in claim 1, wherein said tools (7) are disposed in mutual side by side relationship on the intermediate body (6), in alignment according to at least one predetermined straight line (R), said movement means (17) comprising a first coupling member (18) interposed between the intermediate body (6) and the support frame (2) to enable a reciprocating motion of the intermediate body in a first direction (19) parallel to said straight line.

3. The machine tool as claimed in claim 1, wherein said tools (7) are disposed mutually in side by side relationship on the intermediate body (6), in alignment according to a predetermined number of straight lines parallel to each other ($R^1$, $R^2$, $R^N$), said movement means (17) comprising a first coupling member (18), interposed between the intermediate body (6) and the support frame (2) to enable a reciprocating displacement of the intermediate body in a first direction (19) parallel to said straight lines, and at least one second coupling member (22), also interposed between the intermediate body and the support frame, to enable a reciprocating displacement of the intermediate body in a second direction (23), transverse to said first direction (19).

4. The machine tool as claimed in claim 1, wherein said intermediate body (6) is defined by a plate-like element having an operating front surface (10) on which said tools are engaged, said operating front surface being turned towards the locking means (8) of the tube submitted to machining.

5. The machine tool as claimed in claims 1 or 4, wherein said grip means (16) comprises a first pick-up member (20), capable of acting by grasping, in cooperation with the movement means (17), on said tubes at the feeding station (3) to bring them to the processing station (9), and at least one second pick-up member (21) capable of acting by grasping, in cooperation with the movement means (17), on said tubes at the processing station to move them until the discharge station (5), said first and second pick-up members being associated with the intermediate body at laterally opposite positions with reference to said tools.

6. The machine tool as claimed in claim 1, comprising a third coupling member (24), interposed between the intermediate body (6) and the support frame (2), to enable a reciprocating displacement of the intermediate body in a third direction (25) parallel to the axis of a tube to be machined located at said processing station (9), to enable each tool (7) to be moved close to and away from said locking means (8).

7. The machine tool as claimed in claim 1, comprising first auxiliary movement means (26) operatively interposed between said grip means (16) and said intermediate body (6), said first auxiliary movement means enabling a displacement of the grip means relative to the intermediate body in a fourth (27) and optionally a fifth (28) direction transverse to the fourth direction, said fourth and fifth directions being transverse to the axis of a tube to be machined located in the processing station (9).

8. The machine tool as claimed in claim 1, comprising second auxiliary movement means (31) operatively interposed between the intermediate body (6) and at least one of said tools (7) to enable displacement thereof in a sixth (32) and optionally a seventh (33) direction transverse to the sixth direction, said sixth and seventh directions being transverse to the axis of a tube to be machined located in the processing station (9).

9. The machine tool as claimed in claim 1, wherein said locking means (8) comprises a clamp (11) defined by a first and a second halves (12 and 13) movable relative to each other between an approaching condition in which the tube is tightened by the locking means, and a moved-apart condition, in which the tube can be released from the locking means.

10. The machine tool as claimed in claim 9, wherein said clamp (11), when said halves (12, 13) are close to each other, defines at least one first and one second groove (14, and 15) for engagement of the tube to be machined, which grooves have differentiated diameters and conformations relative to each other.

11. The machine tool as claimed in claim 1, wherein said service unit (37) comprises at least one support body (38) and at least one grip element (39) intended to act on a portion of the tube being machined, said grip element being engaged with the support body for rotation according to a predetermined vertical axis (40), as well as for movement in a first and second auxiliary directions (41, 42) which are respectively transverse and parallel to the axis of the tube at an anchoring position in said locking means (8).

12. A machine tool for tube processing, comprising:

a support frame (2);

a tool-carrying intermediate body (6) operatively associated with the support frame;

means (8) for locking at least one tube (4) at a predetermined processing station (9);

a predetermined number of tools (7) carried by the intermediate body (6) and each arranged to carry out a respective machining on said tube (4), said tools (7) being disposed in mutual side by relationship on the intermediate body (6), in alignment according to at least one predetermined straight line (R);

grip means (16) operatively associated with the support frame (2) and arranged to act by grasping on each tube, said grip means (16) being carried by the intermediate body (6), and movement means (17) operatively interposed between the intermediate body (6) and the support frame (2) and capable of moving the intermediate body to enable displacement of each tool (7) between a rest position in which it is spaced apart from the tube being machined, and an operating position in which it acts on said tube, and also capable of moving said grip means (16) to enable displacement of same from a feeding station (3) in which unprocessed tubes are picked up, to the processing station (9) and from the latter to a discharge station (5), in which the machined tubes are laid down, said movement means (17) comprising a first coupling member (18) interposed between the intermediate body (6) and the support frame (2) to enable a reciprocating motion of the intermediate body in a first direction (19) parallel to said straight line, said grip means (16) comprising a first pick-up memeber (20), capable of acting by grasping, in cooperation with the movement means (17), on said tubes at the feeding station (3) to bring them to the processing station (9), wherein the grip means (16) further comprises at least one second pick-up member (21) capable of acting by grasping in cooperation with the movement means (17) on said tubes at the processing station to move them until the discharge station (5), said first and second pick up members being associated with the intermediate body at laterally opposite portions with reference to said tools.

13. The machine tool as claimed in claim 12, wherein said tools (7) are disposed mutually in side by side relationship on the intermediate body (6), in alignment according to a predetermined number of straight lines parallel to each other ($R^1$, $R^2$, $R^N$), said movement means (17) comprising a first coupling member (18), interposed between the intermediate body (6) and the support frame (2) to enable a reciprocating displacement of the intermediate body in a first direction (19) parallel to said straight lines, and at least one second coupling member (22), also interposed between the intermediate body and the support frame, to enable a reciprocating displacement of the intermediate body in a second direction (23), transverse to said first direction (19).

14. The machine tool as claimed in claim 12, wherein said intermediate body (6) is defined by a plate-like element having an operating front surface (10) on which said tools are engaged, said operating front surface being turned towards the locking means (8) of the tube submitted to machining.

15. The machine tool as claimed in claim 12, comprising first auxiliary movement means (26) operatively interposed between said grip means (16) and said intermediate body (6), said first auxiliary movement means enabling a displacement of the grip means relative to the intermediate body in a fourth (27) and optionally a fifth (28) direction transverse to the fourth direction, said fourth and fifth directions being transverse to the axis of a tube to be bent located in the processing station (9).

16. A machine tool for tube processing, comprising:

a support frame (2);

a tool-carrying intermediate body (6) operatively associated with the support frame;

means (8) for locking at least one tube (4) at a predetermined processing station (9) said tube presenting a longitudinal axis;

a predetermined number of tools (7) carried by the intermediate body (6) and each arranged to carry out a respective machining on said tube (4);

grip means (16) operatively associated with the support frame (2) and arranged to act by grasping on each tube, said grip means (16) being carried by the intermediate body (6), and movement means (17) operatively interposed between the intermediate body (6) and the support frame (2) and capable of moving the intermediate body to enable displacement of each tool (7) between a rest position in which it is spaced apart from the tube being machined, and an operating position in which it acts on said tube, and also capable of moving said grip means (16) to enable displacement of same tube maintaining unchanged the direction of the tube longitudinal axis from a feeding station (3) in which unprocessed tubes are picked up, to the processing station (9) and from the latter to a discharge station (5), in which the machined tubes are laid down, wherein said tools (7) are disposed in mutual side by side relationship on the intermediate body (6), in alignment according to at least one predetermined straight line (R) and wherein said movement means (17) comprises a first coupling member (18) interposed between the intermediate body (6) and the support frame (2) to enable a reciprocating motion of the intermediate body in a first direction (19) parallel to said straight line.

17. The machine tool as claimed in claim 16, wherein said tools (7) are disposed mutually in side by side relationship on the intermediate body (6), in alignment according to a predetermined number of straight lines parallel to each other ($R^1$, $R^2$, $R^N$), said movement means (17) comprising a first coupling member (18), interposed between the intermediate body (6) and the support frame (2) to enable a reciprocating displacement of the intermediate body in a first direction (19) parallel to said straight lines, and at least one second coupling member (22), also interposed between the intermediate body and the support frame, to enable a reciprocating displacement of the intermediate body in a second direction (23), transverse to said first direction (19).

18. The machine tool as claimed in claim 16, wherein said intermediate body (6) is defined by a plate-like element having an operating front surface (10) on which said tools are engaged, said operating front surface being turned towards the locking means (8) of the tube submitted to machining.

19. The machine tool as claimed in claim 16, wherein said grip means (16) comprises a first pick-up member (20), capable of acting by grasping, in cooperation with the movement means (17), on said tubes at the feeding station (3) to bring them to the processing station (9). and at least one second pick-up member (21) capable of acting by grasping, in cooperation with the movement means (17), on said tubes at the processing station to move them until the discharge station (5), said first and second pick-up members being associated with the intermediate body at laterally opposite positions with reference to said tools.

* * * * *